US007049347B2

(12) United States Patent
Hu

(10) Patent No.: US 7,049,347 B2
(45) Date of Patent: *May 23, 2006

(54) METHOD FOR MAKING FINE AND ULTRAFINE SPHERICAL PARTICLES OF ZIRCONIUM TITANATE AND OTHER MIXED METAL OXIDE SYSTEMS

(75) Inventor: Michael Z. Hu, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 351 days.

This patent is subject to a terminal disclaimer.

(21) Appl. No.: 10/623,395

(22) Filed: Jul. 18, 2003

(65) Prior Publication Data

US 2005/0014850 A1 Jan. 20, 2005

(51) Int. Cl.
- B01F 3/12 (2006.01)
- C01G 23/02 (2006.01)
- C01G 25/02 (2006.01)
- C04B 35/46 (2006.01)

(52) U.S. Cl. ............ 516/78; 516/22; 516/33; 516/34; 516/90; 423/21.1; 423/65; 423/85; 423/92; 423/122; 423/338; 423/594.12; 423/598; 501/134

(58) Field of Classification Search ............. 516/78
See application file for complete search history.

(56) References Cited

U.S. PATENT DOCUMENTS

| 3,330,697 | A | | 7/1967 | Pechini |
| 4,970,182 | A | * | 11/1990 | Shirasaki ............ 423/598 |
| 6,264,912 | B1 | * | 7/2001 | Hu ............ 423/598 |
| 6,506,320 | B1 | | 1/2003 | Kobayashi et al. |
| 6,602,607 | B1 | | 8/2003 | Rengakuji et al. |
| 6,806,295 | B1 | * | 10/2004 | Hu ............ 516/22 |

OTHER PUBLICATIONS

Mahandrimanana, A. et al., "Nonhydrolytic Sol-Gel Process: Aluminum and Zirconium Titanate Gels," 1997, p. 89-93, 8.

Mahandrimanana, A. et al., "Non-hydrolytic Sol-Gel Process: Zirconium Titanante Gels," J. Mater. Chem., 1997, pp. 279-284, 7(2).

(Continued)

Primary Examiner—Randy Gulakowski
Assistant Examiner—Timothy J. Kugel
(74) Attorney, Agent, or Firm—Quarles & Brady LLP

(57) ABSTRACT

Disclosed is a method for making amorphous spherical particles of zirconium titanate and crystalline spherical particles of zirconium titanate comprising the steps of mixing an aqueous solution of zirconium salt and an aqueous solution of titanium salt into a mixed solution having equal moles of zirconium and titanium and having a total salt concentration in the range from 0.01 M to about 0.5 M. A stearic dispersant and an organic solvent is added to the mixed salt solution, subjecting the zirconium salt and the titanium salt in the mixed solution to a coprecipitation reaction forming a solution containing amorphous spherical particles of zirconium titanate wherein the volume ratio of the organic solvent to aqueous part is in the range from 1 to 5. The solution of amorphous spherical particles is incubated in an oven at a temperature $\leq 100°$ C. for a period of time $\leq 24$ hours converting the amorphous particles to fine or ultrafine crystalline spherical particles of zirconium titanate.

11 Claims, 17 Drawing Sheets

OTHER PUBLICATIONS

Azough, F. et al., "The Relationship Between the Microstructure and Microwave . . . ," J. Mater. Sci., 1996, p. 2539-2549, 31.

Bateman, C. et al., "CAD Representation of the Systems ZrO2-MgO-Tio2 and . . . ," Physica B, 1988, p. 122-128, 150.

Bianco, A. et al., "Zirconium Titanate: from Polymeric Precursors to Bulk Ceramics," J. Eur. Cer. Soc., 1998, p. 1235-1243, 18.

Bianco, A. et al., "Zirconium Titanate Microwave Dielectrics Prepared via Polymeric Precursor Route," J. Eur. Cer. Soc., 1999, p. 959-963, 19.

Bhattacharya, A. et al., "Low-temperature Synthesis and Characterisation of Crystalline Zirconium Titanate Powder," Mat. Lett. 1994, p. 247-250, 18.

Bhattacharya, A. et al., "Inorganic Sol Gel Synthesis of Zirconium Titanate Fibres," J. Mater. Sci., 1996, p. 5583-5586, 31.

Bhattacharya, A. et al., "Sol Gel Preparation, Structure and Thermal Stability . . . ," J. Mater. Sci., 1996, p. 267-271, 31.

Bonhomme-Coury, L. et al., Preparation of Al2TiO5-ZrO2 Mixed Powders via Sol-Gel Process, J. Sol Gel Sci. & Technol., 1994, p. 371-375, 2.

Chen, D. et al., "Hydrothermal Synthesis and Characterization of Crystalline ZrxTi1-xO4 . . . ," J. Mater. Sci. 1999, 1379-1383, 34.

Cerqueira, M. et al., "Synthesis and Characterization of PLZT (9/65/35) by the Pechini Method and Partial Oxalate," Mater. Lett., 1998, 166-171, 35.

Cerqueira, M. et al., "Synthesis of Ultra-fine Crystalline ZrxTi1-xO4 Powder by Polymeric Precursor Method," Mater. Lett., 1995, 181-185, 22.

Ellis, S. et al., "Powder Synthesis Research at CAMP," Cer. Bull., 1989. 988-994, 68.

Hirano, S. et al., "Chemical Processsing and Microwave Characteristics . . . ," J. Am. Ceram. Soc., 1991, 1320-24, 74.

Hu, M. et al., "Sol-Gel and Ultrafine Particle Formation via Dielectric Tuning of Inorganic Salt . . . ," J. Colloid Inter. Sci., 2000, 20-36, 222.

Hu, M. et al., "Wet-chemical Synthesis of Monodispersed Barium Titanate Particles . . . ," J. Powder Technol., 2000, 2-14, 110.

Hu, M. et al., "Homogeneous (co)precipitation of Inorganic Salts for Synthesis . . . ," J. Mater. Sci., 2000, 2927-2936, 35.

Ikawa, H. et al., "X-ray.Photoelectron Spectroscopy Study of High and Low-Temperature Forms . . . ," J. Am. Ceram. Soc., 1991, 1459-62, 74.

Ikawa, H. et al., "Phase Transformation and Thermal Expansion . . . ," J. Am. Ceram. Soc., 1988, 120-27, 71 (2).

Isobe, T. et al., "Mechanochemical Synthesis of ZrTiO4 Precursor From Inhomogeneous Mixed Gels," Mater. Res. Soc. Symp. Proc., 1994, 273-77, 346.

Karakchiev, L. et al., "Low-Temperature Synthesis of Zirconium Titanate," Inorg. Mater., 2001, 386-390, 37.

Khairulla, F. et al., Chemical Synthesis and Structural Evolution of Zirconium Titanate, Mater. Sci. Eng., 1992, 327-336, B12.

Komarneni, S. et al., "Sol-Gel Processing of Some Electroceramic Powders," J. Sol-Gel Sci. Technolo., 1999, 263-270, 15.

Krebs, M. et al., "A Raman Spectral Characterization of Various Crystalline Mixtures . . . ," J. Mater. Sci. Lett., 1988, 1327-1330, 7.

Leite, E. et al., "Particle Growth During Calcination of Polycation Oxides Synthesized by the Polymeric Precursors Method,"J. Am. Ceram. Soc. 1997, 2649-57, 80.

Leoni, M. et al., "Aqueous Synthesis and Sintering of Zirconium Titanate Powders for Microwave Components," J. Eur. Ceram. Soc., 2001, 1739-41, 21.

Lessing, P., "Mixed-Cation Oxide Powders via Polymeric Precursors," Ceram. Bull., 1989, 1002-06, 68(5).

Macias, L. et al., "Kinetic Study of Crystallization in Zirconium Titanate from an Amorphous Reactive Prepared Precursor," J. Non-Crys. Solids, 1992, 262-65, 147&148.

McHale, A. et al., Low-Temperature Phase Relationships in the System ZrO2-TiO2, J. Am. Ceram. Soc., 1986, 827-32, 69.

Montanaro, L. et al., "Preparation of Microspheres from an Alumina-Zirconia Sol," Ceram. Bull., 1989, 1017-20, 68(5).

Moon, Y. et al., "Preparation of Monodisperse ZrO2 by the Microwave Heating of Zirconyl Chloride Solutions," J. Am. Ceram. Soc., 1995, 1103-1106, 78.

Navio, J. et al., "Heterogeneous Photocatalytic Oxidation . . . ," New Developments in Selective Oxidation II, 1994, 721-721, 82.

Navio, J. et al., "Photocatalysed Oxidation . . . ," Heterogeneous Catalysis and Fine Chemicals III, 1993, 431-437, 78.

Navio, J. et al., "Formation of Zirconium Titanate Powder from a Sol-Gel Prepared Reactive Precursor," J. Mater. Sci., 1992a, 2463-2467, 27.

Navio, J. et al., "On the Influence of Chemical Processing in the Crystallization . . . ," J. Mater. Sci. Lett., 1992, 1570-1572, 11.

Navio, J. et al., "Thermal Evolution of (Zr,Ti)O2 Gels Synthesized at Different Basic pH," J. Therm. Anal., 1993, 1095-1102, 40.

Park, H. et al., "Effect of Solvent on Titania Particle Formation and Morphology in Thermal Hydrolysis of TiC14," J. Am. Ceram. Soc., 1997, 743-49, 80(3).

Sanchez, P. et al., "Thermal Evolution of TiO2-ZrO2 Composites Prepared by Chemical Coating Processing," Mater. Lett., 1994, 339-344, 20.

Sekar, M. et al., "Hydrazine Carboxylate Precursors to Fine Particle . . . ," Mat. Res. Bull., 1993, 485-492, 28.

Sham, E. et al., "Zirconium Titanate from Sol-Gel Synthesis: Thermal Decomposition and Quantitative Phase Analysis," J. Solid State Chem., 1998, 225-32, 139.

Stubicar, M. et al., "Synthesis of ZrTiO4 Powder from Equimolar ZrO2 Powder Mixture by High Energy . . . ," Metalurgija, 1999, 59-62, 38(2).

Syamal, A., "Hydrazine Carboxylate Precursors to Fine Particle Titania, Zirconia, and Zirconium Titanate," Mater. Res. Bull., 1994, 1001-1003, 29(9).

Xu, J. et al., "X-ray Diffraction and X-ray Absorption Spectroscopy . . . ," Chem. Mater., 2000, 3347-3355, 12.

Yamaguchi, O. et al., "Formation of Zirconia Titanate Solid from Alkoxides," J. Am. Ceram. Soc., 1989, 1065-66, 72(6).

Zhang, S. et al., "Effect of Composition on Sinterability . . . ," J. Mater. Sci. Lett., 2001-1409-1411, 20.

Bianco, A. et al., "Zirconium Tin Titanate Thin Films via Aqueous Polymeric Precursor Route," Mater. Sci. & Eng. C, 2001, 211-213, 15.

Rengakuji, S. et al., "Preparation and Hydrocarbon Sensing Properties of Ti-Zr-O Thin Films," Electrochemistry (Technical Paper), 2001.

Stubicar, M. et al., "Microstructure Evolution of an Equimolar Powder Mixture of ZrO2-TiO2 . . . ," J. Alloys and Compounds, 2001, 316-320,316.

Hu, M., High-Tech. Alert, 1998, 1, 15(2).

* cited by examiner

METHOD FOR MAKING FINE AND ULTRAFINE SPHERICAL PARTICLES OF ZIRCONIUM TITANATE AND OTHER MIXED METAL OXIDE SYSTEMS

The United States government has rights in this invention pursuant to contract no. DE-AC05-00OR22725 between the United States Department of Energy and UT-Battelle, LLC.

CROSS-RELATED APPLICATIONS

The present application is related to U.S. application Ser. No. 09/397,814 filed Sep. 17, 1999, now U.S. Pat. No. 6,806,295, incorporated herein by reference.

FIELD OF THE INVENTION

The present invention relates to a method for preparing spherical particles of binary metal oxide materials and other multiple or mixed metal oxide materials, particularly fine and ultrafine dispersed spherical particles of zirconium titanate.

BACKGROUND OF THE INVENTION

Zirconium titanate (ZT)-based ceramic materials (in the form of solid solutions) have many unique properties such as high resistivity, high dielectric constant (thus providing high charge storage capacity), high permittivity at microwave frequencies, and excellent temperature stability of microwave properties. They have extremely wide applications such as in microwave telecommunications (as capacitors, dielectric resonators in filters and oscillators) and in catalysis as effective acid-base bi-functional catalysts and photocatalysts. In the form of thin films, they also find advanced applications in piezoelectric sensors, transducers, ultrasonic motors, hydrocarbon sensors, integrated microwave devices, refractory materials, high-temperature pigments, composites for high-temperature corrosive environments, and thin-film optics. In addition, ZT powders (crystalline $Zr_xT_{1-x}O_4$) can be good precursor materials for synthesis of other valuable electroceramics such as lead zirconate titanate (PZT) or lanthanum doped PZT (PLZT) see Chen et at., "Hydrothermal Synthesis and Characterization of Crystalline $Zr_xT_{1-x}O_4$ . . . ", J. Mater. Sci., 1999, 1379–1383, 34; and Cerqueira et al., "Synthesis and Characterization of PLZT (9/65/35) by the Pechini Method and Partial Oxalate", Mater. Lett., 1998, 166–171, 35, both references incorporated herein by reference). PZT is the most used electroceramic material in industrial applications as actuations and transducers.

As is true for many other materials, ultrafine-grained, high quality powders of ZT are in high demand. Fine powders are necessary precursors for making monolithic ceramics via casting as well as ceramic films via coating process. For such a binary (two metal elements) oxide system, compositional homogeneity and microstructure uniformity (low or no phase segregation) are very important. It is well known that powder characteristics such as particle size, shape, size distribution, agglomeration, crystallite size, chemical and phase composition, determine to a large extent, the microstructures developed during sintering and thus affect the properties of ceramic materials. On the other hand, it is necessary to use fine and single phase ZT powder to obtain fine and sinterable PZT powders by the partial oxalate method (Cerqueira et al., "Synthesis of Ultra-fine Crystalline $Zr_xTi_{1-x}O_4$ Powder by Polymeric Precursor Method", Mater. Lett., 1995, 181–185, 22).

In order to obtain high purity and better homogeneity materials, various chemical solution synthesis methods have been developed as alternatives to the conventional solid-state-reaction route, which normally requires high temperature (1200° C.–1700° C.) over a prolonged period for the homogeneous materials synthesis from the mixed crystalline ceramic oxides $ZrO_2$ and $TiO_2$ and further requires post treatment such as energy-intensive grinding/milling procedures for powder formation. Still, this usually leads to inhomogeneous, coarse, and multiphase powders of poor purity. Amorphous precipitates or gels (called precursors) are usually produced through chemical solution routes, which are characterized by their unparalleled ability to generate ultrafine, high purity and stoichiometric ceramic powders at low processing temperature. Pure oxide materials can be obtained by thermal processes of dehydration and crystallization of precursor precipitates, gels or particles. Several major wet chemical routes include: sol-gel processes; synthesis from metallorganic salts; chemical precipitation and coprecipitation of metal salts from aqueous solutions; mixed-cation oxides via thermal decomposition of polymeric precursors wherein powders produced by this method are usually irregular in shape, strongly agglomerated because of the thermal decomposition step, and widely distributed in size; and high-energy ball-milling.

Among the aforementioned synthesis routes, few could produce ultrafine powders containing aggregation-free, monodispersed, microsphere particles. Some routes such as the classical sol-gel process and some polymeric precursor methods involve the use of expensive metal alkoxide salt(s) or commercially unavailable metallorganic salts. Most routes, such as gel-forming via precipitation or polymeric precursor methods, still require the undesirable procedure of grinding dried gels into powders with no control of particle shape. Irregular shaped powdered ceramic particles are both difficult to handle and use on an industrial scale and thus spherical particles are preferred for many distinct advantages. The submicron, spherical particles reported by Hirano et al. at "Chemical Processing and Microwave Characteristics . . . ", J. Am. Ceram. Soc., 74, 1320–24, (1991), obtained by controlled hydrolysis of metal alkoxides, are agglomerated. Bhattacharya et al. "Sol Gel Preparation, Structure and Thermal Stability of Crystalline Zirconium Titanate Microspheres", J. Mater. Sci. 31, 267–271, (1996), produced dispersed, sphere-shaped particles; however, the size of the reported "microspheres" was in the range of 15–50 µm, which is quite large for applications that require ultrafine particles (i.e., submicron to a few micrometers in diameter).

OBJECTS OF THE INVENTION

Accordingly, it is an object of the present invention to provide a method for making amorphous spherical particles of zirconium titanate.

It is another object of the present invention to provide a method for making amorphous spherical particles of a mixed metal oxide material.

It is yet another object of the present invention to provide a method for making fine and ultrafine-sized, dispersed crystalline spherical particles of zirconium titanate having tailored intraparticle nanostructures.

It is still yet another objective of the present invention to provide a method for making fine and ultrafine-sized, dispersed spherical particles of a mixed metal oxide material having tailored intraparticle nanostructures.

These and other objects, features and advantages of the present invention will become apparent after a review of the following detailed description of the disclosed embodiments and the appended claims.

SUMMARY OF THE INVENTION

In accordance with one aspect of the present invention, the foregoing and other objects are achieved by a method for making amorphous spherical particles of zirconium titanate having tailored intraparticle nanostructures comprising the steps of first, preparing an aqueous solution of a zirconium salt and preparing an aqueous solution of a titanium salt. Then, mixing the salt solutions into a mixed salt solution wherein the mixed salt solution has about equal moles of zirconium and titanium and wherein the mixed salt solution has a total salt concentration in the range from 0.01 M to about 0.5 M. A stearic dispersant and an organic solvent is then added to the mixed salt solution, subjecting the zirconium salt and the titanium salt in the mixed salt solution to a coprecipitation reaction to form a liquid solution containing amorphous spherical particles of zirconium titanate having tailored intraparticle nanostructures wherein the volume ratio of the organic solvent to aqueous part is in the range from 1 to 5.

In accordance with another aspect of the present invention, other objects are achieved by a method for making fine or ultrafine crystalline spherical particles of zirconium titanate having tailored intraparticle nanostructures comprising the steps of first, preparing an aqueous solution of a zirconium salt and preparing an aqueous solution of a titanium salt. Then, mixing the salt solutions into a mixed salt solution wherein the mixed salt solution has about equal moles of zirconium and titanium and wherein the mixed salt solution has a total salt concentration in the range from 0.01 M to about 0.5 M. A stearic dispersant and an organic solvent is then added to the mixed salt solution, subjecting the zirconium salt and the titanium salt in the mixed salt solution to a coprecipitation reaction to form a liquid solution containing amorphous spherical particles of zirconium titanate having tailored intraparticle nanostructures wherein the volume ratio of the organic solvent to aqueous part is in the range from 1 to 5. Then, the liquid solution containing amorphous spherical particles is incubated in an oven at a temperature of less than or equal to 100° C. for a period of time of less than or equal to 24 hours to convert the amorphous spherical particles to fine or ultrafine crystalline spherical particles of zirconium titanate wherein the salt concentration, volume ratio of the organic solvent to aqueous part, the temperature of the oven and the incubation time are selected to produce spherical particles having a desired size and tailored intraparticle nanostructure.

BRIEF DESCRIPTION OF THE DRAWINGS

In the drawings:

FIG. 9b is the high-resolution TEM image of the homogeneous mesoporous amorphous phase inside the microsphere under the same sample synthesis conditions as FIG. 9a.

Figure 1A:
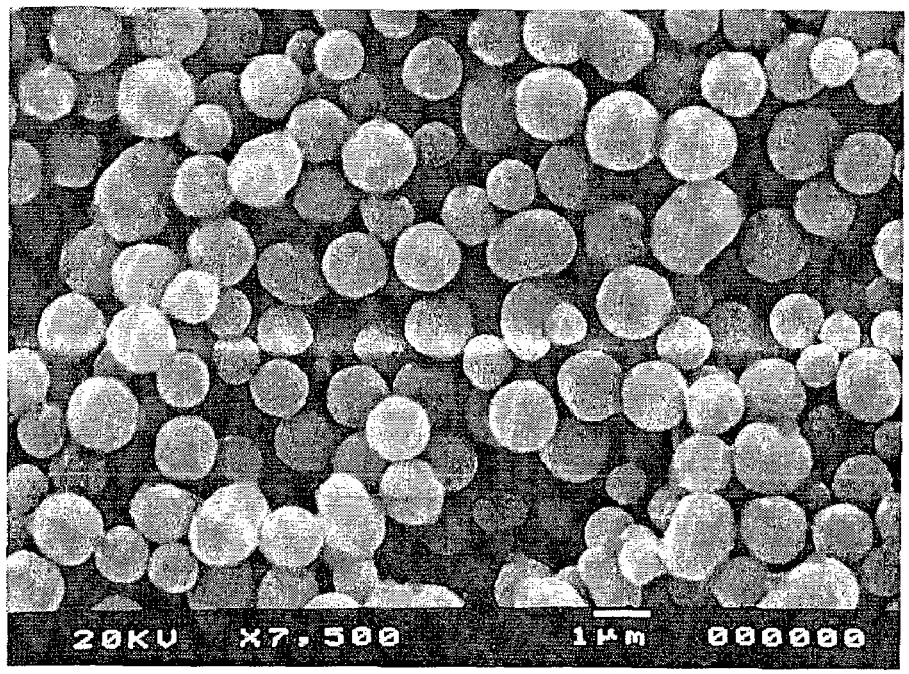
FIG. 1a shows a scanning electron microscope (SEM) photograph of ultrafine microspheres of $ZrO_2$ particles under the following conditions: zirconyl chloride ($ZrOCl_2$)=0.1 M, volumetric ratio of alcohol to aqueous part (RH)=3/1, temperature (T)=100° C., time (t)=24 hr, hydroxyl propyl cellulose (HPC)=$2.0 \times 10^{-3}$ g/cm$^3$.

For a better understanding of the present invention, together with other and further objects, advantages and capabilities thereof, reference is made to the following disclosure and appended claims in connection with the above-described drawings.

DETAILED DESCRIPTION OF THE INVENTION

The method of the present invention utilizes low-temperature dielectric-tuning coprecipitation to produce high quality zirconium titanate products: monodispersed microspheres and nanospheres containing uniform amorphous nanostructures and homogeneous composition. These spherical particles range in particle size from fine microspherical particles to ultrafine nanospherical particles ranging from nanometers to a few micrometers. The zirconium titanate spherical particles have tailored intraparticle nanostructure (pores). The size of the spherical particles and the intraparticle nanostructure can be controlled or tailored by adjusting the process parameters such as salt concentration, alcohol-to-water or organic solvent-to-water volume ratio, incubation temperature and heating time, as well as the type of heating means used during incubation. Heating means includes conventional oven and microwave oven. Nanospherical particles were successfully prepared using rapid microwave heating for rapid nucleation and growth of the spherical particles. These amorphous zirconium titanate spherical particles may be converted to other zirconium titanate products such as ultrafine-sized crystalline spherical particles (crystalline powder) as well as lead zirconium titanate and lanthanum doped lead zirconium titanate.

EXAMPLE

Solution preparation. Titanium tetrachloride (5.56 mL of $TiCl_4$ 99.6%, Alfa Aesar, Ward Hill, Mass.) was slowly added to ice-cold aqueous HCl solution (2.85 mL of 1.0 N HCl added in approximately 20 mL deionized distilled water) that was constantly stirred in a 50-mL volumetric flask. The acidity is needed to minimize the explosive generation of orthotitanic acid [$(Ti(OH)_4)$]. The final concentration of $TiCl_4$ was made up as 1.0 M. The stock solution was freshly prepared and usually left overnight before use. Stock solutions for zirconyl chloride (1.0 M, $ZrOCl_2$ 99.0%, EA Science)) and hydroxypropylcellulose (HPC, 0.1 g/cm$^3$) were also prepared for convenience in conducting multiple experiments.

Synthesis of zirconium titanate microspheres. A 30-mL mixture containing zirconyl chloride, titanium tetrachloride, HPC, filtered deionized water, and isopropanol was kept in a 40-mL, screw-capped glass vial. The mixed solution was then incubated for a predetermined amount of time at 100° C. in order to produce ZT microspheres. The conditions controlled for the ZT synthesis were salt concentrations (C) 0.025–0.2 M $ZrOCl_2$ and 0.025–0.2 M $TiCl_4$, volume ratio of isopropanol over aqueous solution (RH) from 1 to 5, HPC concentration fixed at 0.002 g/cm$^3$, the heating temperature (T) typically at 100° C., and incubation heating time (t) varying from 15 min to 24 h. Equal molar concentrations of zirconyl chloride and titanium tetrachloride were used to prepare each ZT sample. To stabilize the microspheres, the ZT particle suspension was routinely neutralized with 5 N $NH_4OH$ before washing with deionized water (twice).

Characterization of particle samples. The evolution of particle size and morphology, with reaction time was analyzed by SEM (JSM-T220A, JEOL) in which the particles were spread and air-dried on conductive carbon tape that was attached to a cylindrical brass stub. The particles on the stub were plasma coated with gold (Hummer 6.2 sputtering system, Anatech LTD) for 3–4 mm in preparation for SEM imaging. Room-temperature X-ray diffraction (RTXRD, Scintag) was used for phase identification and analysis of crystallite size in the oxide powder samples. The crystallization process of the amorphous powders and the phase transformation in the temperature range of 27 to 1200° C. were monitored in real time by a HTXRD (for detailed instrument description, see Hu et al., *J. Am. Ceram. Soc.* 82, 2313, 1999, incorporated herein by reference). Complementary DTA/TGA was also performed (alumina crucible, sample weight 100 mg) using the following conditions: heating rate, 5° C./min; peak temperature, 1250° C.; and air flow, 100 cm$^3$/min. Specific surface areas of dried powder samples were analyzed using a nitrogen adsorption analyzer (Micromeritics, Atlanta, Ga.).

Figure 1B:
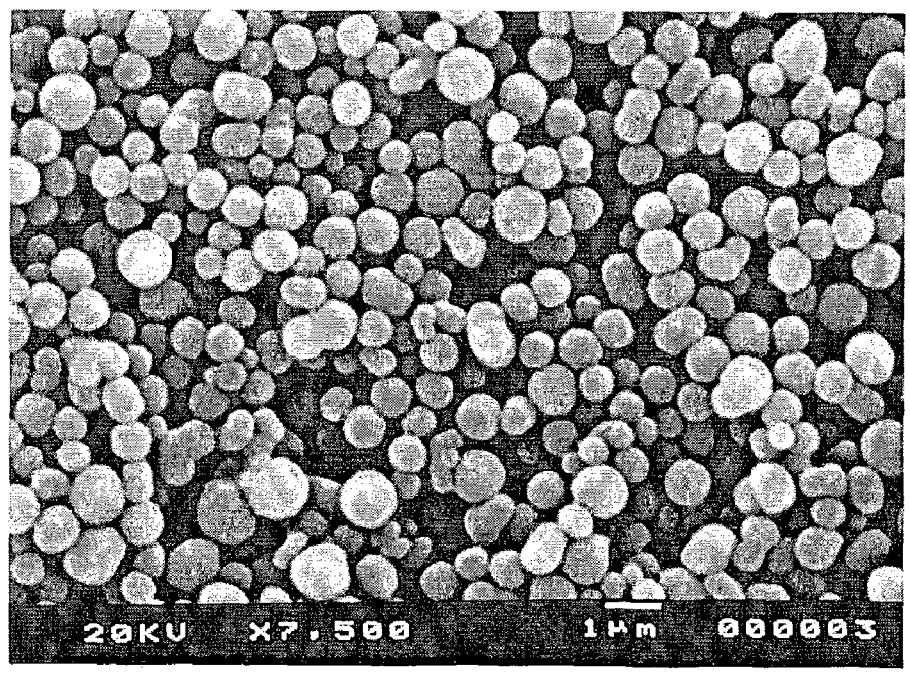
FIG. 1b shows a SEM photograph of ultrafine microspheres of $TiO_2$ particles under the following conditions: titanium tetrachloride ($TiCl_4$)=0.1 M, RH=3/1, T=100° C., t=24 hr, HPC=$2.0 \times 10^{-1}$ g/cm$^3$.
Figure 2A:
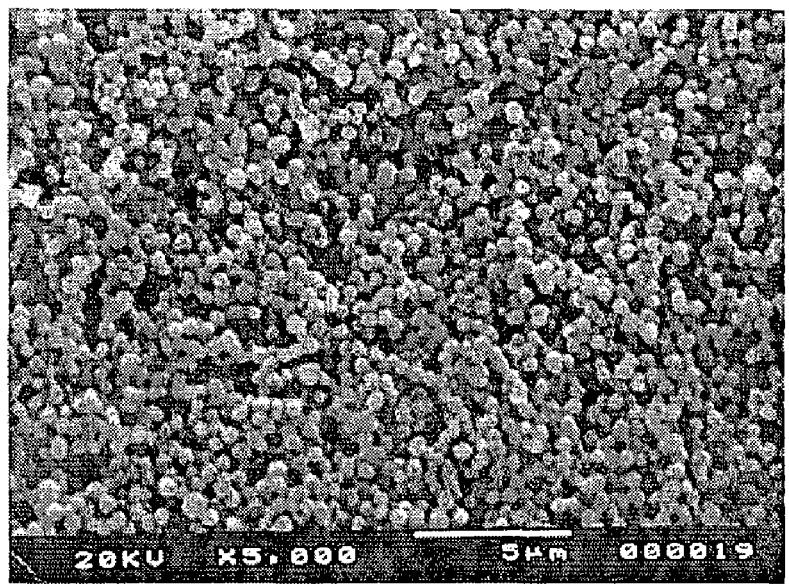
FIG. 2a shows a SEM photograph of near-monodispersed microspheres of binary oxide (ZT) precursor particles showing the effect of metal salt concentration on particle size under the following conditions: RH=3/1, T=100° C., t=24 hr, HPC=$2.0 \times 10^{-3}$ g/cm$^3$ wherein the metal salt concentration (C) 0.025 M.
Figure 2B:
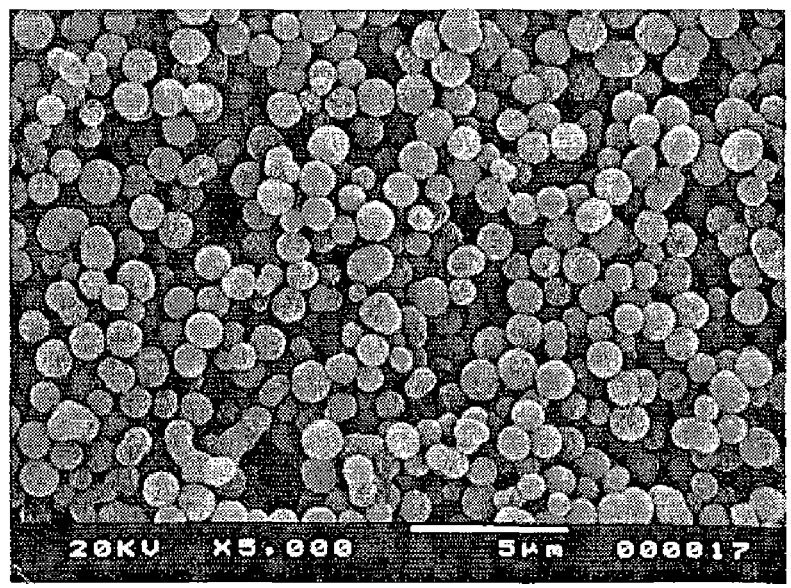
FIG. 2b shows a SEM photograph of near-monodispersed microspheres of ZT precursor particles showing the effect of metal salt concentration on particle size under the following conditions: RH=3/1, T=100° C., t=24 hr, HPC=$2.0 \times 10^{-3}$ g/cm$^3$ wherein the metal salt concentration (C)=0.05 M.
Figure 2C:
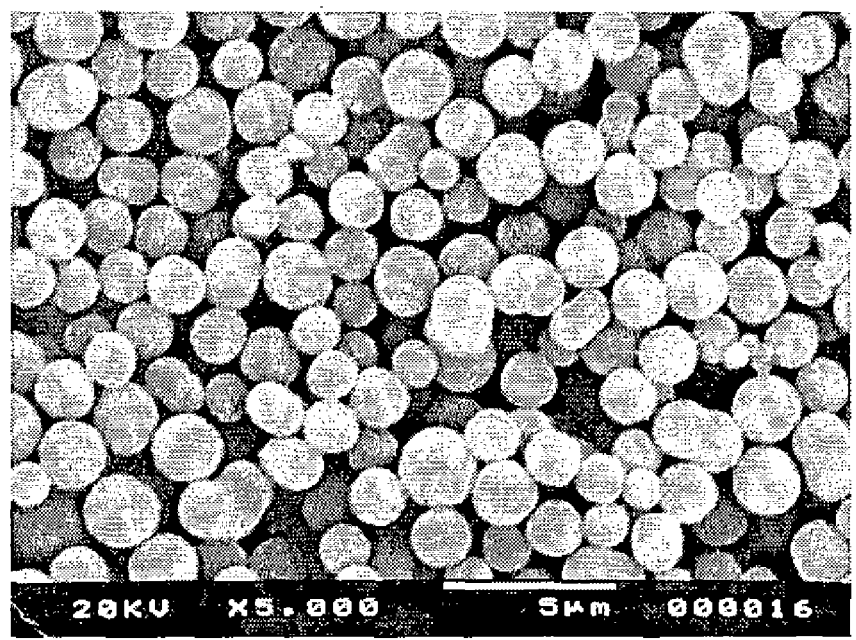
FIG. 2c shows a SEM photograph of near-monodispersed microspheres of ZT precursor particles showing the effect of metal salt concentration on particle size under the following conditions: RH=3/1, T 100° C., t=24 hr, HPC=$2.0 \times 10^{-3}$ g/cm$^3$ wherein the metal salt concentration (C)=0.1 M.
Figure 2D:
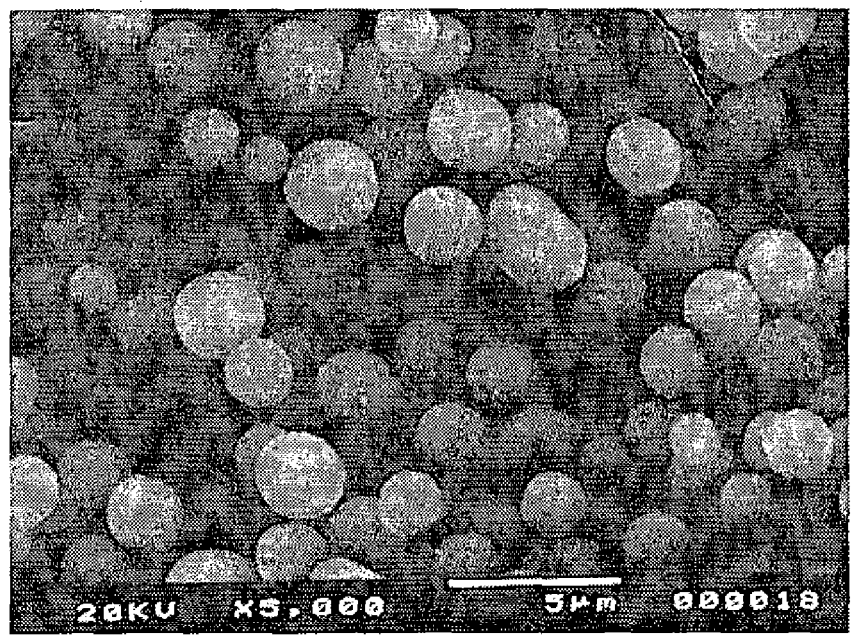
FIG. 2d shows a SEM photograph of near-monodispersed microspheres of ZT precursor particles showing the effect of metal salt concentration on particle size under the following conditions: RH=3/1, T=100° C., t=24 hr, HPC=$2.0 \times 10^{-3}$ g/cm$^3$ wherein the metal salt concentration (C)=0.2 M.
Figure 3A:
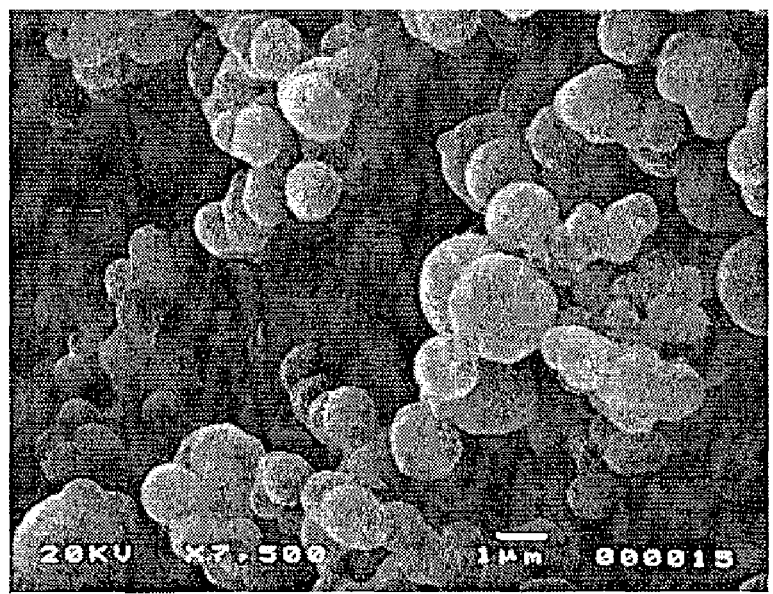
FIG. 3a shows a SEM photograph of the effect of alcohol volume fraction (RH ratio) on ZT particles under the following conditions: C=0.1 M, T=100° C., t=24 hr, HPC=$2.0 \times 10^{-3}$ g/cm$^3$ and RH=1/1.
Figure 3B:
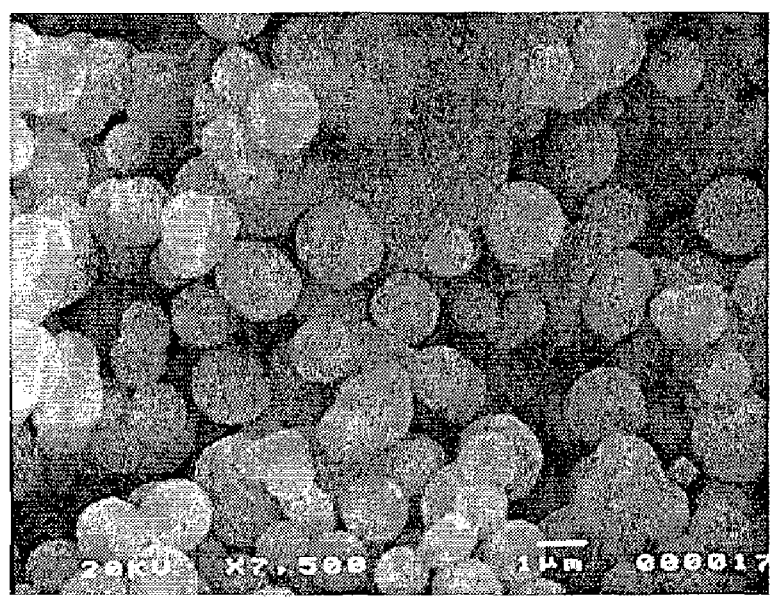
FIG. 3b shows a SEM photograph of the effect of alcohol volume fraction (RH ratio) on ZT particles under the following conditions: C=0.1 M, T=100° C., t=24 hr, HPC=$2.0 \times 10^{-3}$ g/cm$^3$ and RH=2/1.
Figure 3C:
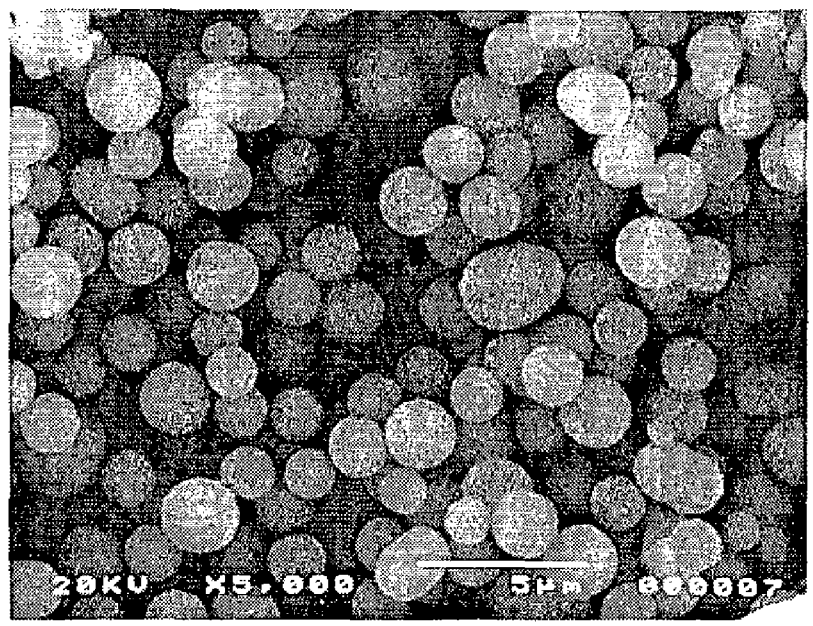
FIG. 3c shows a SEM photograph of the effect of alcohol volume fraction (RH ratio) on ZT particles under the following conditions: C=0.1 M, T=100° C., t=24 hr, HPC=$2.0 \times 10^{-3}$ g/cm$^3$ and RH=3/1.
Figure 3D:
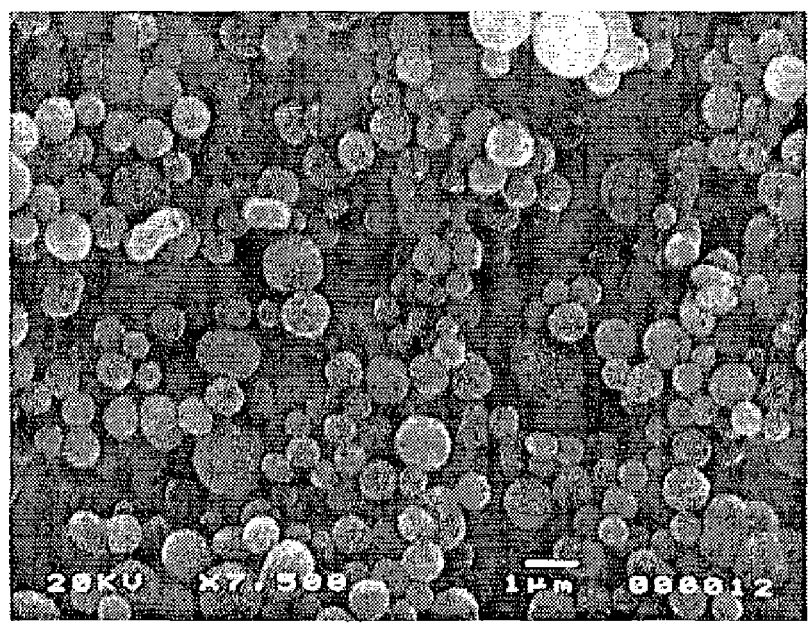
FIG. 3d shows a SEM photograph of the effect of alcohol volume fraction (RH ratio) on ZT particles under the following conditions: C=0.1 M, T=100° C., t=24 hr, HPC=$2.0 \times 10^{-3}$ g/cm$^3$ and RH=4/1.
Figure 3E:
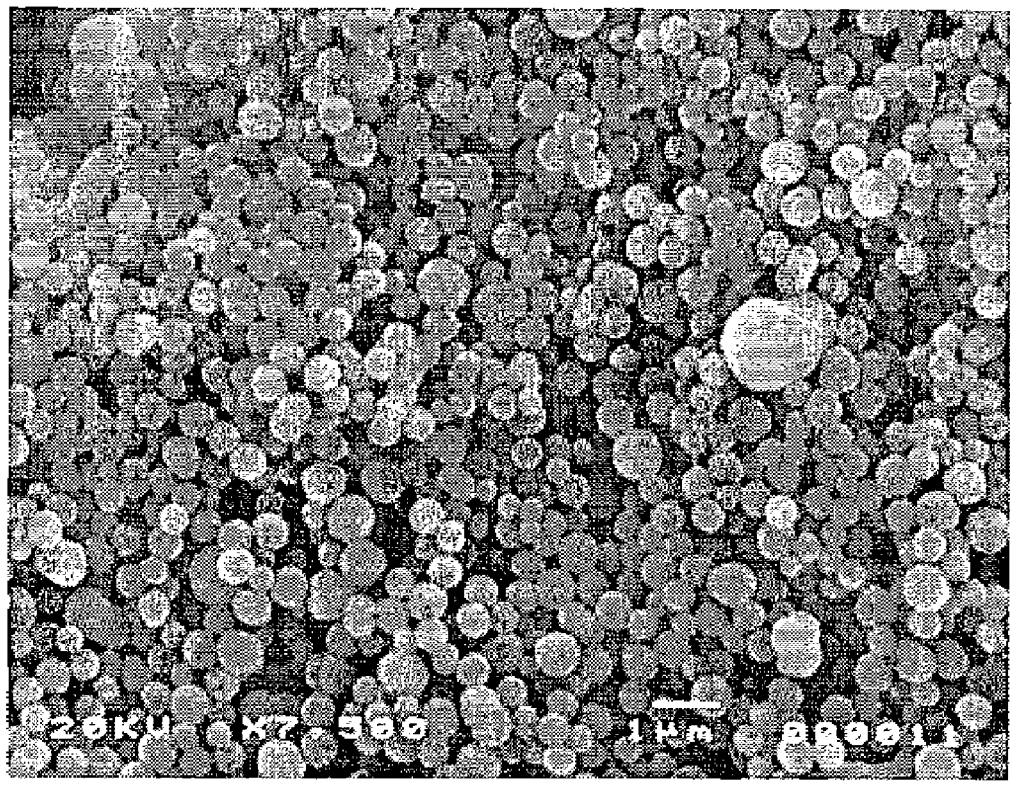
FIG. 3e shows a SEM photograph of the effect of alcohol volume fraction (RH ratio) on ZT particles under the following conditions: C=0.1 M, T=100° C., t=24 hr, HPC=$2.0 \times 10^{-3}$ g/cm$^3$ and RH=5/1.
Figure 4A:
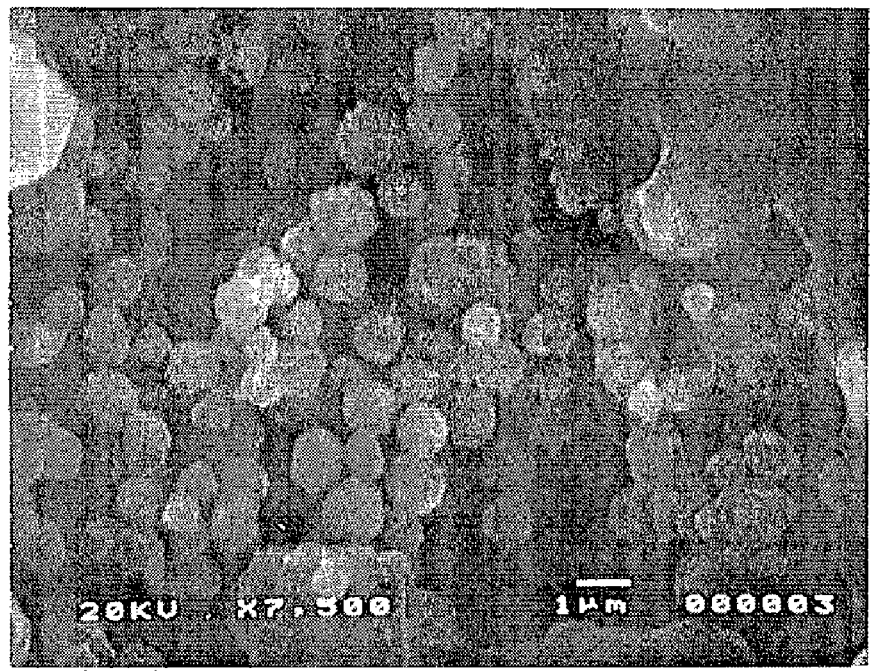
FIG. 4a shows a SEM photograph of the kinetic process of ZT microsphere evolution with reaction time under the following conditions: C=0.1 M, RH=3/1, T=100° C., HPC=$2.0 \times 10^{-3}$ g/cm$^3$ and t=0.5 hr.
Figure 4B:
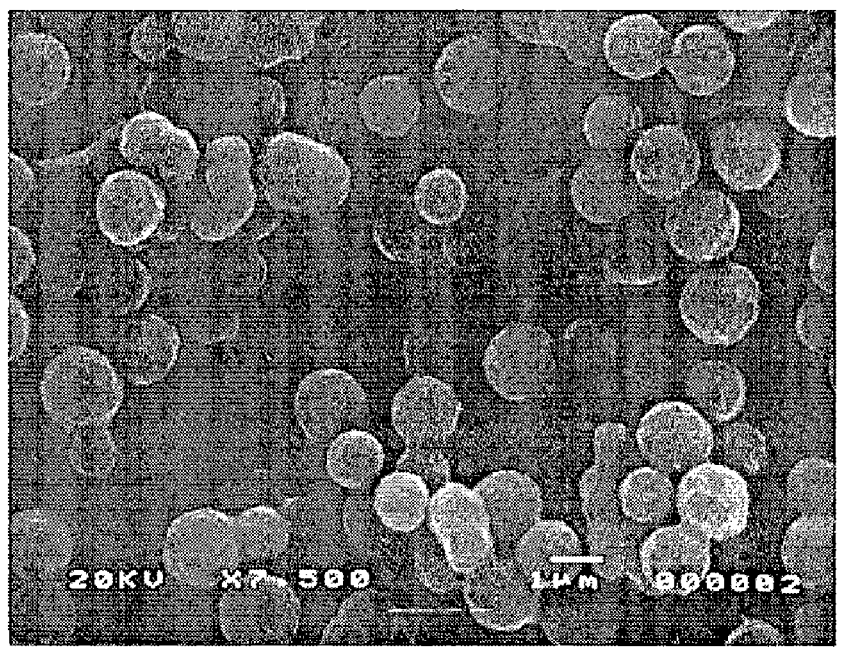
FIG. 4b shows a SEM photograph of the kinetic process of ZT microsphere evolution with reaction time under the following conditions: C=0.1 M, RH=3/1, T=100° C., HPC=$2.0 \times 10^{-3}$ g/cm$^3$ and t=1.5 hr.
Figure 4C:
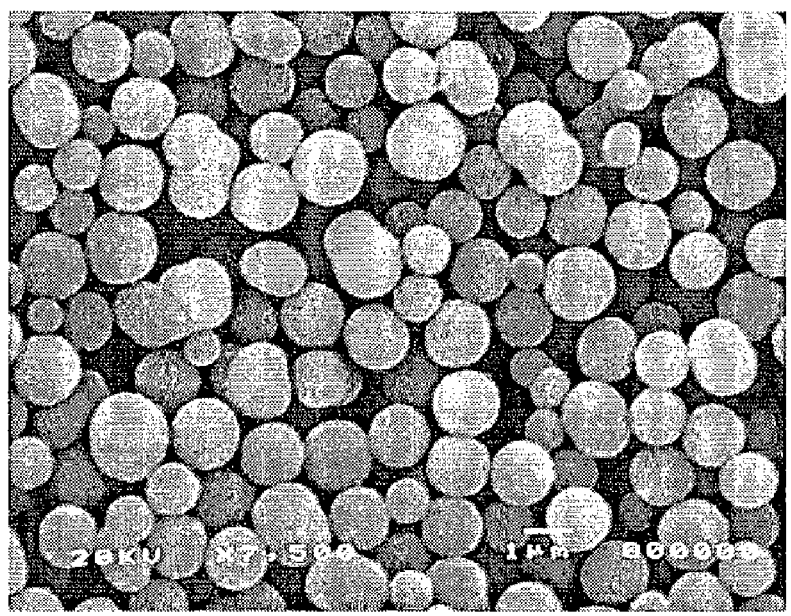
FIG. 4c shows a SEM photograph of the kinetic process of ZT microsphere evolution with reaction time under the following conditions: C=0.1 M, RH=3/1, T=100° C., HPC=$2.0 \times 10^{-3}$ g/cm$^3$ and t=3.5 hr.
Figure 4D:
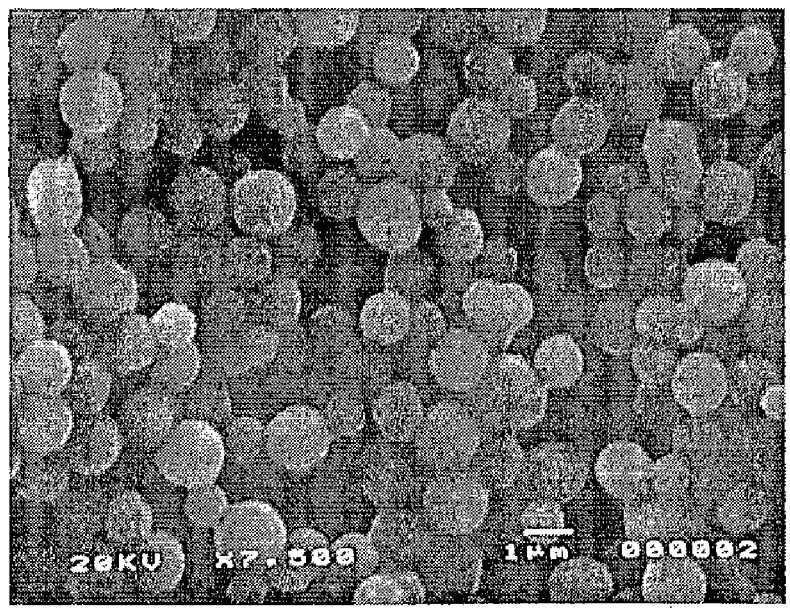
FIG. 4d shows a SEM photograph of the kinetic process of ZT microsphere evolution with reaction time under the following conditions: C=0.1 M, RH=3/1, T=100° C., HPC=$2.0 \times 10^{-3}$ g/cm$^3$ and t=6 hr.
Figure 4E:
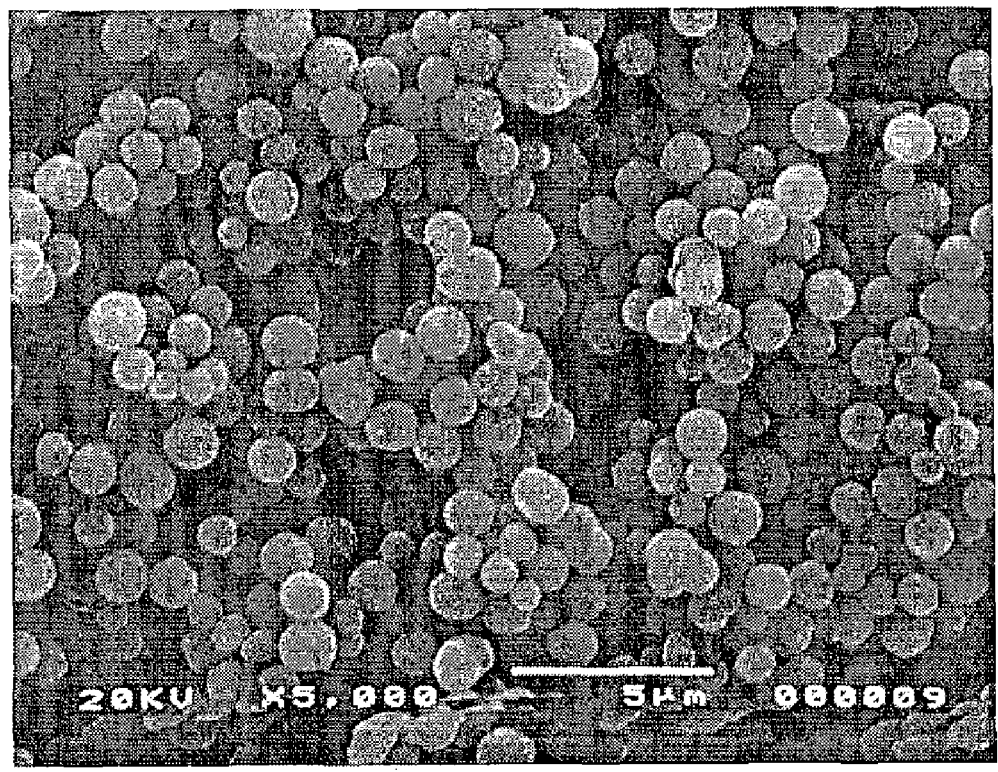
FIG. 4e shows a SEM photograph of the kinetic process of ZT microsphere evolution with reaction time under the following conditions: C=0.1 M, RH=3/1, T=100° C., HPC=$2.0 \times 10^{-3}$ g/cm$^3$ and t=24 hr.

Single oxide precursor particles for zirconia and titania, which were used as a control test, are shown in FIG. 1. The dielectric-tuning precipitation method has previously proven successful for the production of single-metal oxide precursor particles (see, Hu et al., "Sol-Gel and Ultrafine Particle Formation via Dielectric Tuning of Inorganic Salt-Alcohol-Water Solutions", *Journal of Colloid and Interface Science*, 222, 20–36, 2000; Park et al., "Effect of Solvent on Titania Particle Formation and Morphology in Thermal Hydrolysis of $TiCl_4$", *J. Am. Ceram. Soc.* 80, 743–49, 1997; Moon et al., "Preparation of Monodispersed and Spherical Zirconia Powders by Heating of Alcohol-Aqueous Salt Solutions," *J. Am. Ceram. Soc.* 78(4):1103–1106, 1995). However, at the time of this earlier work, it was unknown if such a method could apply to the synthesis of binary metal oxides, in particular the production of ultrafine ZT precursor particles due to unknown factors as inhomogeneous composition or crystalline-phase segregation occurring during coprecipitation of mixed salts, due to different precipitation/crystallization kinetics. The process parameters for ZT synthesis include initial metal salt concentration (C, Zr/Ti molar ratio fixed at 1), isopropanol content in solution (RH ratio, a volume ratio of alcohol to aqueous solution), temperature (T), incubation heating time (t), and HPC concentration (fixed at $2.0 \times 10^{-3}$ g/cm$^3$ for use in this study). Results shown in FIG. 2 clearly demonstrate that near-monodispersed microspheres of binary oxide (ZT) precursor particles can be produced when both zirconium chloride and titanium tetrachloride are mixed at equimolar concentrations in the initial synthesis solutions. The significant effect of the initial metal ion concentration in mixed solutions on the particle size is also shown in FIG. 2. With increases in metal salt molar concentration from 0.025 M to 0.2 M, the ZT-precursor particle size increased from submicrometer range to a few micrometers in diameter (FIG. 2). In addition, the RH ratio affects not only the size of particles but also their agglomeration state (FIG. 3). At a low RH ratio (1/1), particles show wide size distribution and are somewhat agglomerated (with an observed neck connection between microspheres). With higher RH ratios (up to 5/1), the particles obtained tend to become smaller and better dispersed.

Figure 5:
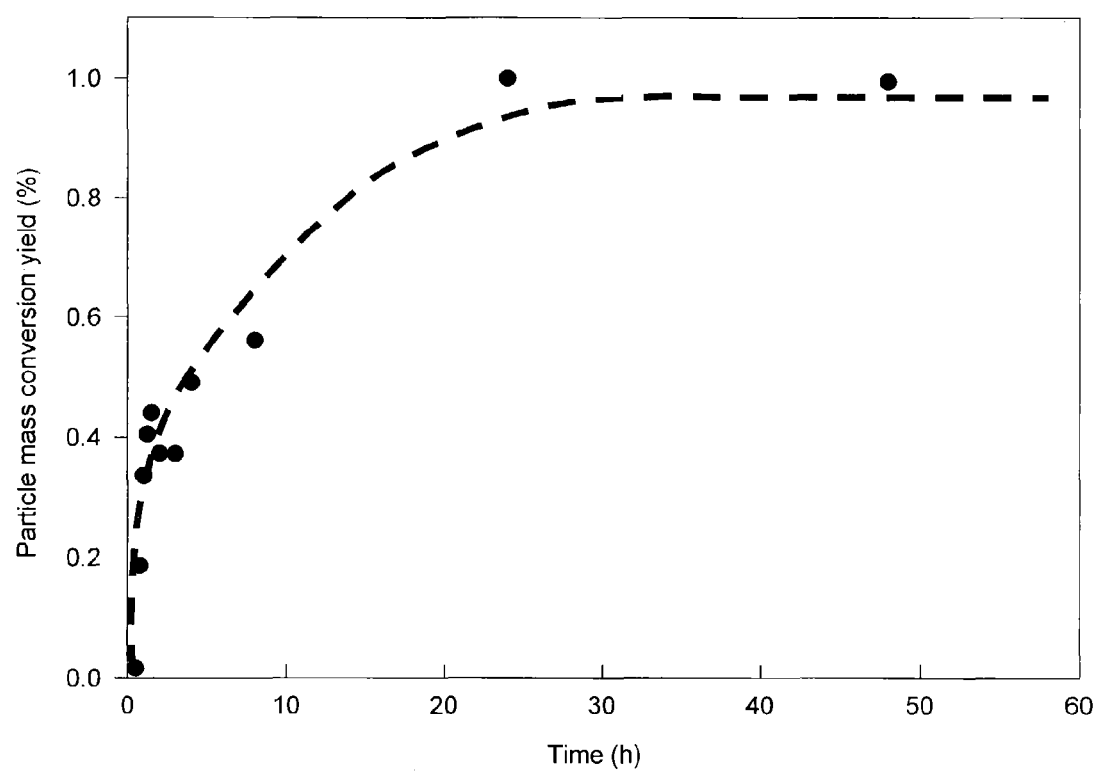
FIG. 5 shows the conversion yield from metal ions into ZT microsphere solid mass at various times under the following conditions: C=0.05 M, RH=3/1, T=100° C., HPC=$2.0 \times 10^{-3}$ g/cm$^3$.

The SEM images in FIG. 4 show the evolution of particles with incubation heating time. The particles seem to be further aged/densified with longer incubation time. At t=0.5 h reaction time, the particles look like embryos that are soft, loosely packed microspheres, while some hydrolyzed metal salt species are not yet ready to be packed into microspheres. At a later time (t=1.5 h), the microspheres are somewhat aggregated and gel-like. The wrinkled surfaces of the microspheres are likely due to the shrinkage of low-density gel particles with drying. After sufficient time (>3.5 h), dense and well-dispersed microsphere particles are formed. Although discrete particles were observed within a few hours of heating, the conversion yield (here defined as the percentage of metal ions converted into a microsphere mass), as shown in FIG. 5, indicates that it requires a much longer period of time (approximately a day) to complete the reaction when the initial molar concentrations of zirconium and titanium are 0.05 M.

Figure 6:
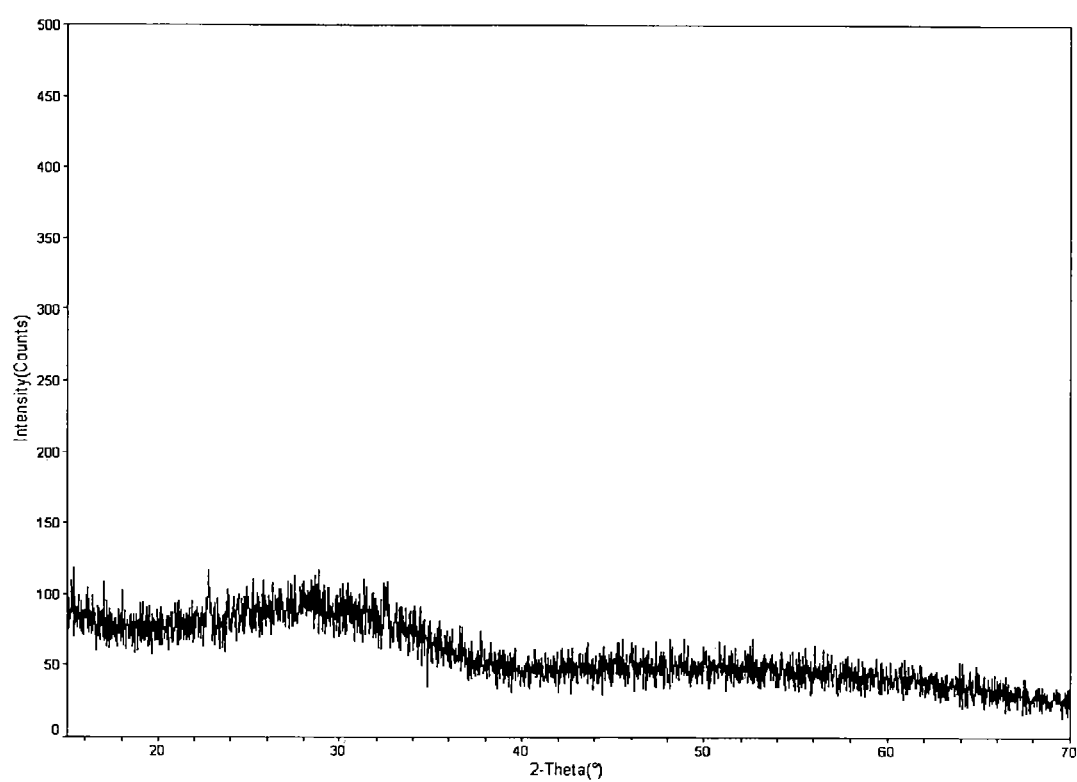
FIG. 6 shows a typical room-temperature X-ray diffraction (RTXRD) spectrum of as-prepared ZT microsphere particles made under the following sample preparation conditions: C=0.1 M, RH=1/1 to 5/1, T=100° C., t=24 hr, HPC=2.0×10$^{-3}$ g/cm$^3$, see FIG. 3 for SEM images.
Figure 7:
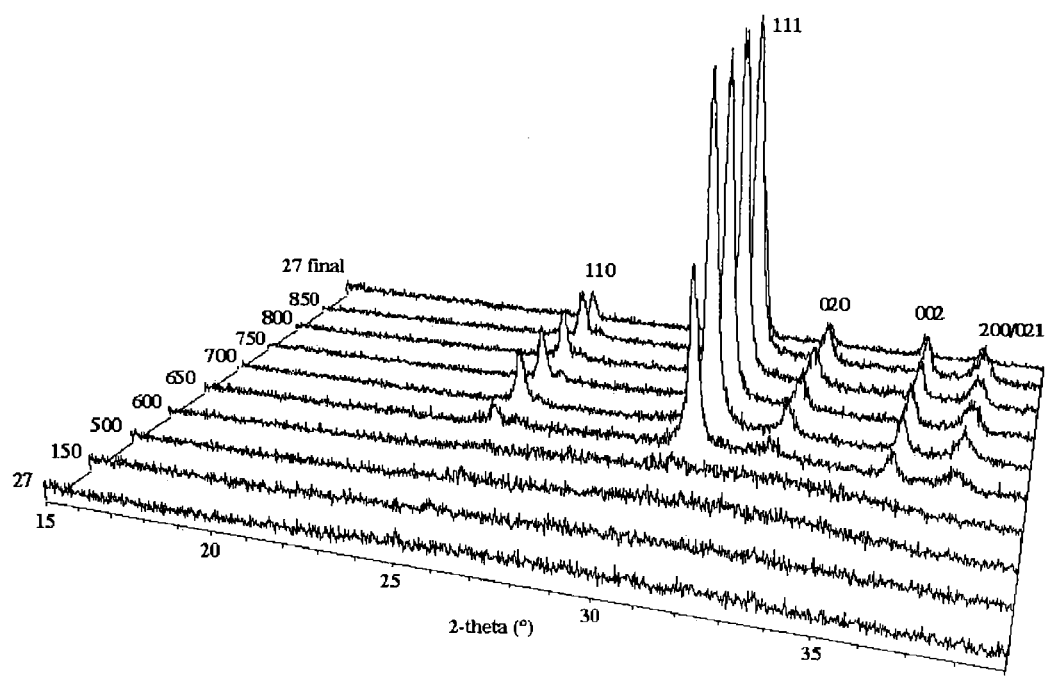
FIG. 7 shows high-temperature X-ray diffraction (HTXRD) spectra during in-situ calcinations of ZT microsphere particles under the following sample preparation conditions: C=0.025 and 0.2 M, RH=3/1, T=100° C., t=24 hr, HPC=2.0×10$^{-3}$ g/cm$^3$, wherein above ~600° C., peaks characteristic of single $ZrTiO_4$ phase are present.

The RTXRD spectrum for a typical as-prepared ZT powder is shown in FIG. 6. The general "hump" of the spectrum indicates the amorphous nature of the particles. Further, variation of the RH value from 1/1 to 5/1 does not change the shape of the spectrum or the amorphous nature of the particles. In situ time-resolved high-temperature XRD (HTXRD) measurements provided information on the evolution and kinetics of the crystallization of the amorphous ZT precursor particles into crystalline powders (FIG. 7). Again, it can be seen that the as-prepared ZT microsphere particles (at temperatures <~600° C.) were amorphous and did not contain any segregated phases such as monoclinic/tetragonal zirconia or anatase/rutile titania. This indicates that the zirconium and titanium salt precursors were converted into a pure amorphous ZT compound during the single-step dielectric-tuning coprecipitation.

HTXRD data (FIG. 7) show that crystallization from amorphous precursor particles occurred around 600° C., which agrees well with earlier reported values for amorphous ZT materials from sol-gel synthesis (Sham et al., "Zirconium Titanate from Sol-Gel Synthesis: Thermal Decomposition and Quantitative Phase Analysis", *J. Solid State Chem*. 139, 225–32, 1998), from a polymer precursor route (Bianco et al., "Zirconium Titanate Microwave Dielectrics Prepared via Polymeric Precursor Route", *J. Eur. Cer. Soc*. 19, 959–963, 1999), and from high-energy dry ball milling of equal molar $ZrO_2$—$TiO_2$ powder mixture (Stubicar et al., "Microstructure Evolution of an Epuimolar Powder Mixture of $ZrO_2$—$TiO_2$ . . . ", *J. Alloys and Compounds*, 316, 316–320, 1999). Single-phase $ZrTiO_4$ (orthorhombic, Pbcn 60, disordered form, JCPDS 34–0415, lattice parameters: a=0.5035, b=0.5487, and c=0.4801) evolved when the sample powder heated up to ~600° C. and also remained after the sample was cooled to room temperature (27° C.). It is generally believed that the cations $Zr^{4+}$ and $Ti^{4+}$ are randomly distributed within the lattice. Based on the phase diagram of the system $TiO_2$—$ZrO_2$ (Bateman and Notis, "CAD Representation of the Systems $ZrO_2$—$MgO$—$TiO_2$ and . . . ", *Physica B*, 150, p. 122–128, 1988), both baddeleyite and ZT solid solution are expected at room temperature for Zr/Ti=1:1; however, the work of the present invention confirmed that no monoclinic zirconia is present in the sample. The HTXRD crystallization evolution spectra are similar for ZT powders from both synthesis concentrations (0.025 and 0.2 M).

Figure 8A:
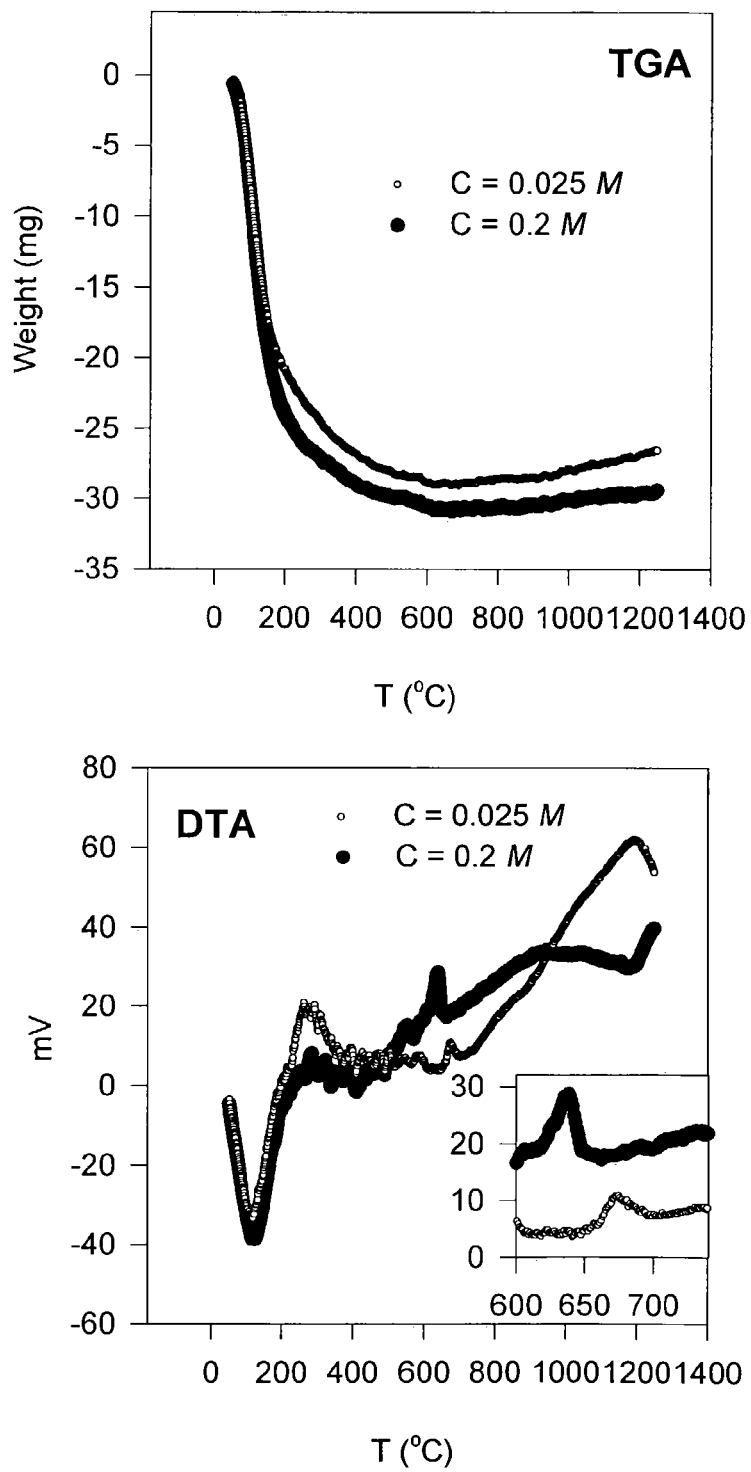
FIG. 8a shows thermociravimetric analysis/differential thermal analysis (TGA/DTA) analysis of ZT samples from various conditions with varying metal salt concentrations from 0.025 to 0.2M.
Figure 8B:
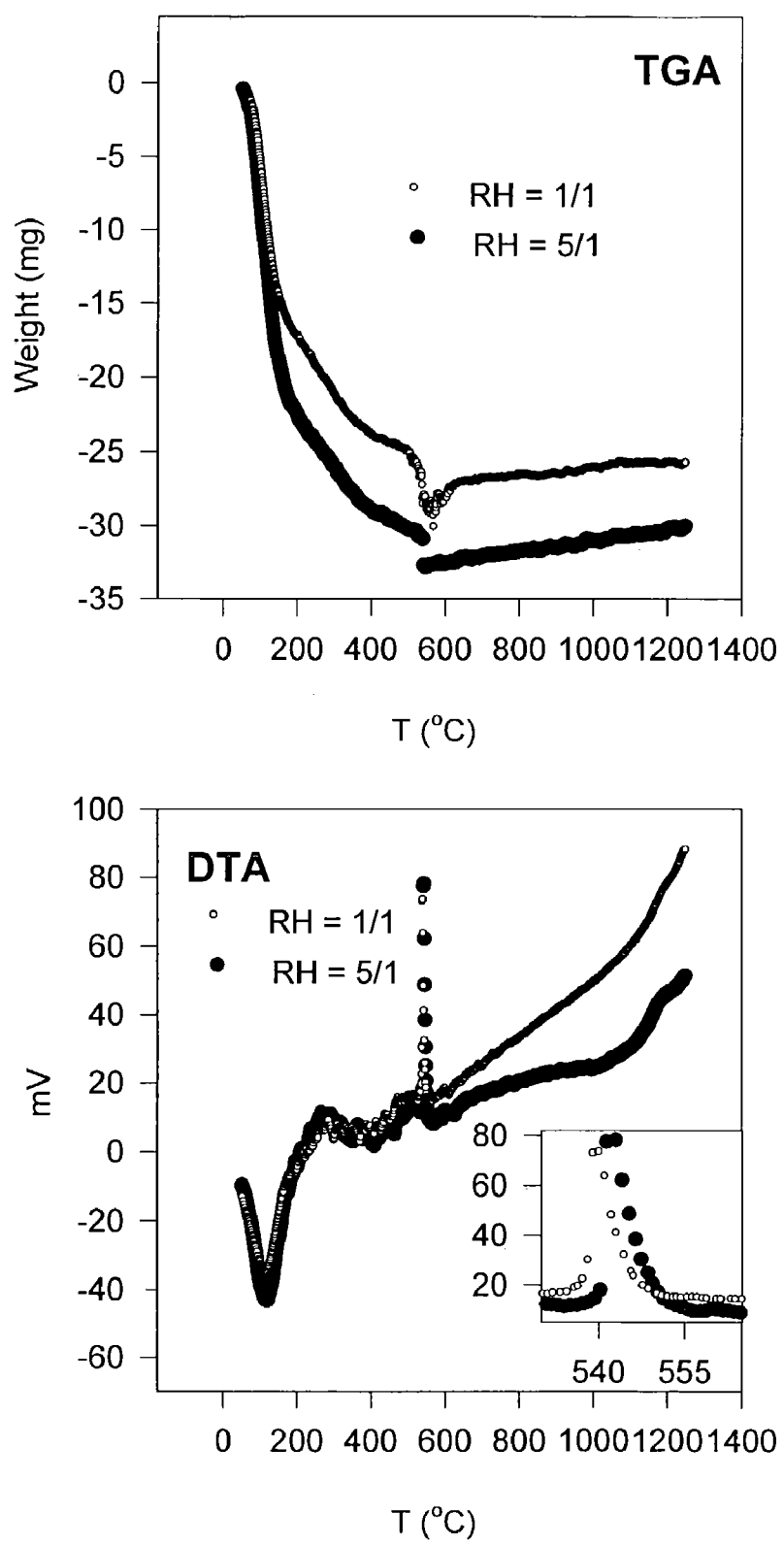
FIG. 8b shows TGA/DTA analysis of ZT samples from various conditions with varying RH from 1/1 to 5/1.

DTA/TGA data for samples obtained from various conditions are shown in FIGS. 8(*a*) and 8(*b*). The TGA plots show that slower coprecipitation rate conditions (i.e., at lower salt concentration and lower RH) seem to generate less hydrated amorphous materials (and less shrinkage and weight loss). The large endothermic peak in the DTA plots (below 200° C.) can be ascribed principally to water elimination from the pores of the particles. The exothermic peak around 200–400° C. (and some smaller peaks up to ~500° C.) could be due to the progressive removal of water molecules bonded into the pores of the solid plus the elimination of alcohol coupled in the particle during the coprecipitation. The significant sharp exothermic peak exhibited at temperatures varying from 530 to 680° C., dependingon the concentration and RH (see inserts of DTA plots in FIG. 8*a* and FIG. 8*b*), corresponds to the crystallization temperature from amorphous to $ZrTiO_4$ orthorhombic crystal. The lowest crystallization temperature for the samples of the present invention was around 530° C. It is known that chemical processing influences the thermal crystallization behavior of ZT materials. Navio et al. (see, "Formation of Zirconium Titanate Powder from a Sol-Gel Prepared Reactive Precursor", *J. Mater. Sci*. 27, 2463–2467, 1992; "On the Influence of Chemical Processing in the Crystallization", *J. Mater. Sci. Lett*., 11, 1570–1572, 1992; and "Thermal Evolution of (Zr,Ti)O$_2$ Gels Synthesized At Different Basic pH", *J. Therm. Anal*. 40, 1095–1102, 1993) found that the formation of peroxo species of Ti and Zr seems to enhance the crystallization of $ZrTiO_4$ at a lower temperature, possibly because the peroxo bonding is broken easily after the thermal treatment. In the work of the present invention, the shifts in crystallization peak clearly indicate that synthesis conditions (initial salt concentration and the RH ratio) affect the crystallization temperature significantly. Increasing the initial salt concentration caused a drop of the crystallization temperature from 675 to 630° C. Such crystallization temperature may be determined by the degree of hydration and the short-range order of the amorphous materials.

Using DTA, Macias et al. ("Kinetic Study of Crystallization in Zirconium Titanate from an Amorphous Reactive Prepared Precursor", *J. Non-Crys. Solids*, 147&148, 262–65, 1992) has conducted a careful kinetic study of crystallization in ZT from an amorphous precursor (hydroxoperoxo compound of Zr and Ti) precipitated by ammonia from titanium or zirconium methanol solutions containing hydrogen peroxide. The same crystallization kinetics model they used should apply to crystallization of other amorphous materials such as those obtained by dielectric-tuning coprecipitation. The reaction rate of a solid-state transformation, obeying a nucleation and growth process, should follow the Johnson-Mehl-Avrami (JMA) kinetic model. The simplified model with Doyle's approximation can be written as $$\ln\left[\ln\frac{1}{1-\alpha}\right] = n\ln\frac{AE}{\beta R} + 5.33n - 1.05\frac{nE}{RT}$$

where α is the reacted fraction, n is a parameter depending on the crystallization mechanism, A is the Arrhenius preexponential factor, E is the activation energy, β is the heating rate, R is the gas constant (=8.3143 J K$^{-1}$ mol$^{-1}$), and T is the absolute temperature. A plot of ln[-ln(1-α)] vs. (1/T) should be a straight line of slope nE. For the ZT crystallization reaction from precursors, Macias et al. ("Kinetic Study of Crystallization in Zirconium Titanate from an Amorphous Reactive Prepared Precursor", J. Non-Crys. Solids. 147&148, 262–65, 1992) determined that n=1.02 which was explained by considering an agglomerated system constituted of a constant number of small particles as nuclei. In such a system, the rate of crystallization is controlled by random nucleation. Using the same method with the data shown in FIG. 8, we determined the activation energy E for our samples: 323 kJ/mol (for RH=5/1), 290 kJ/mol (for RH=1/1), 174 kJ/mol (for C=0.2 M), and 139 kJ/mol (for C=0.025 M). There seems to be a general trend of increase in activation energy with increasing RH and solution concentration C. The activation energies for crystallization from the precursor powders prepared by the method of the present invention are significantly lower than the value reported in the literature, i.e., 620 kJ/mol (Macias et al., "Kinetic Study of Crystallization in Zirconium Titanate from an Amorphous Reactive Prepared Precursor", J. Non-Crys. Solids. 147&148, 262–65, 1992). This means that the nanostructured precursor ZT powders of the present invention are much easier to crystallize.

Figure 9A:
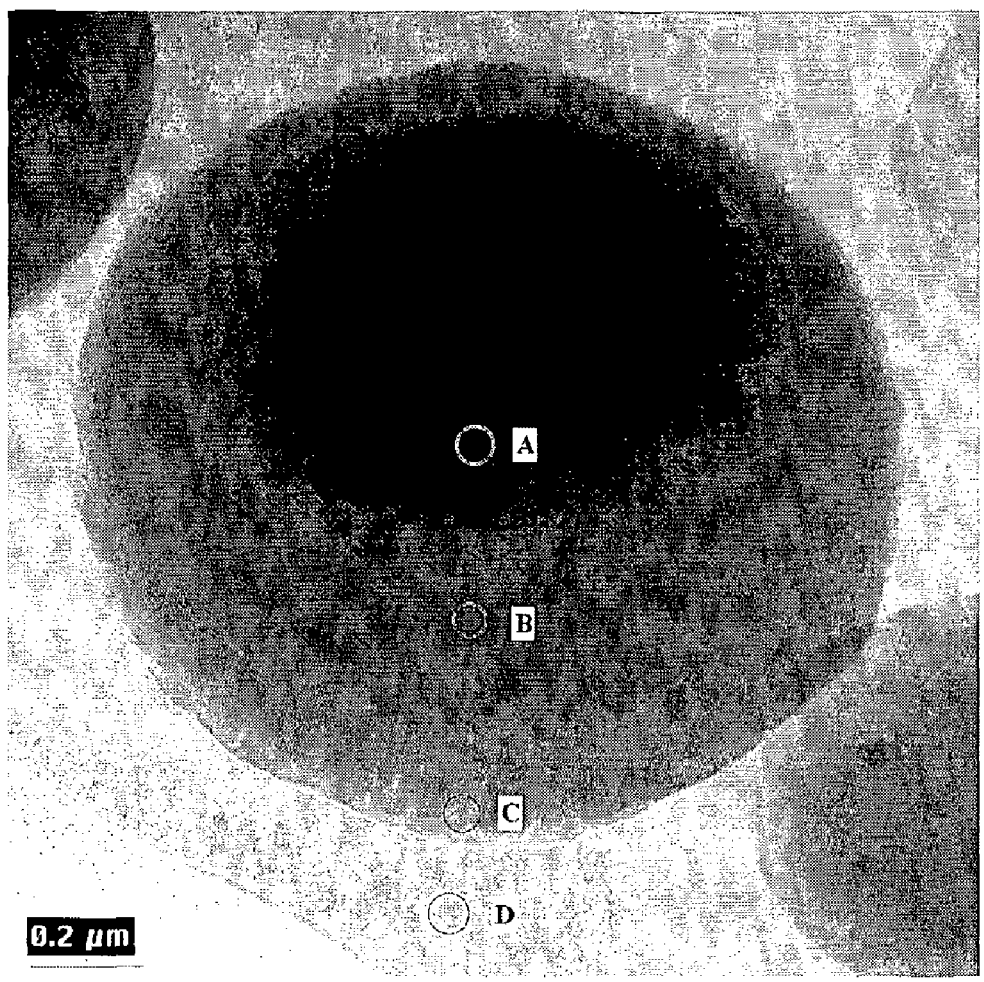
FIG. 9a is a high-resolution transmission electron microscope (TEM) image of a ZT microsphere wherein Point D is in the resin for TEM sample preparation; sample synthesis conditions: C=0.1 M, RH=2/1, T=100° C., t=24 hr, HPC=2.0×10$^{-3}$ g/cm$^3$.
Figure 9B:
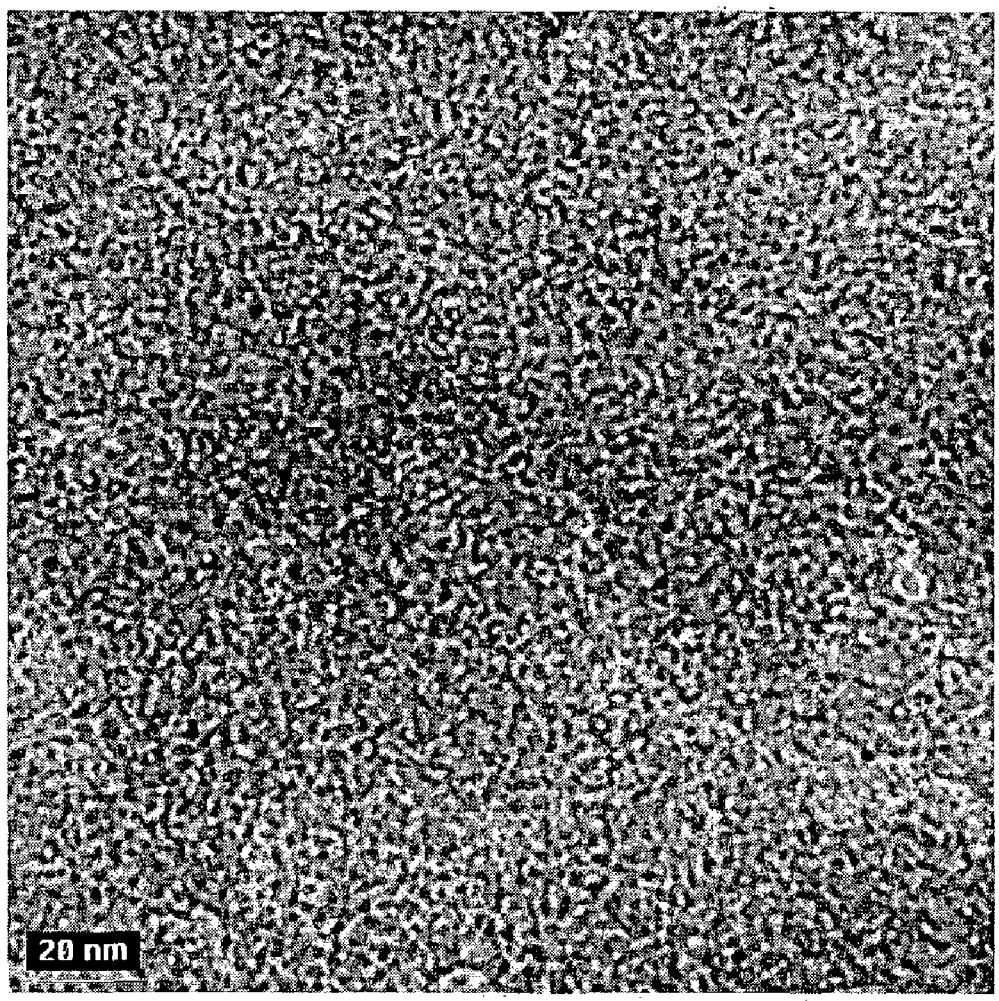

The performance of ZT-based devices depends on the compositional and microstructural features of the ZT material. High resolution TEM (FIG. 9, thin slice of cross-section of a microsphere) was used to examine these two aspects of as-prepared powders. Each individual particle looks essentially spherical (FIG. 9(a)) even under high magnification. Energy dispersive spectroscopy (EDS) analysis at three positions (A, B, and C) across the microsphere indicated that the chemical composition of the microsphere is homogeneous and identical. FIG. 9(b) also shows the homogeneous internal amorphous nanostructure with no phase segregation. The microsphere seems to contain some pores of a few nanometers in dimension. These intraparticle nanopores may explain why some of the samples have relatively high specific surface areas (Table 1). Processing parameters such as the RH ratio may be tuned to tailor the intraparticle nanostructure of the microsphere in addition to the microsphere size and agglomeration state. Surface area data (see Table 1) and TEM image (FIG. 9(b)) confirm the existence of the. nanostructural mesopores inside some of the microsphere particles.

TABLE 1

Effect of RH ratio on specific surface areas and pore sizes in as-prepared ZT powder.

| Conc. C [M] | RH Ratio | Surface Area [m$^2$/g] (BET multipoint) | Surface Area [m$^2$/g] (Langmuir) | Pore size* (nm) |
|---|---|---|---|---|
| 0.1 | 2/1 | 489.80 | 845.51 | not measured |
| 0.1 | 4/1 | 76.37 | 121.61 | ~4. |
| 0.1 | 3/1 | 0.8128 | 1.1318 | not determined |
| 0.2 | 3/1 | 0.0568 | 0.0621 | not determined |
| 0.05 | 3/1 | 1.1163 | 1.5944 | ~20 |

Conditions for sample preparation: T = 100° C., t = 24 h, HPC = 2.0 × 10$^{-3}$ g/cm$^3$.
*Pore diameter at the peak of BJH adsorption dV/dD pore volume plot.

It was previously reported that when a high homogeneity level is not achieved, crystallization of TiO$_2$ is observed before crystallization into ZrTiO$_4$ (see Navio et al., "Formation of Zirconium Titanate Powder from a Sol-Gel Prepared Reactive Precursor", J. Mater. Sci. 27, 2463–2467, 1992; and Navio et al., "On the Influence of Chemical Processing in the Crystallization", J. Mater. Sci. Lett., 11, 1570–1572, 1992), whereas homogeneous gels crystallize directly into ZrTiO$_4$ below 700° C. (see Bhattacharya et al., "Low-temperature Synthesis and Characterisation of Crystalline Zirconium Titanate Powder", Mat. Lett. 18, 247–250, 1994; Bhattacharya et al., "Inorganic Sol Gel Synthesis of Zirconium Titanate Fibres", J. Mater. Sci., 31, p. 5583–5586 1996; Isobe et al., "Mechanochemical Synthesis of ZrTiO$_4$ Precursor From Inhomogeneous Mixed Gels". Mater. Res. Soc. Symp. Proc. 346, 273–277, 1994; Bonhomme-Coury et al., "Preparation of Al$_2$TiO$_5$—ZrO$_2$ Mixed Powders via Sol-Gel Process", J. Sol Gel Sci. & Technol. 2, 371–375, 1994; Macias et al., "Kinetic Study of Crystallization in Zirconium Titanate from an Amorphous Reactive Prepared Precursor", J. Non-Crys. Solids. 147&148, 262–65, 1992; McHale and Roth, "Low Temperature Phase Relationships in the System ZrO$_2$—TiO$_2$, J. Am. Ceram. Soc. 69, 827–832, 1986). In the dielectric-tuning coprecipitation process of the present invention, using equal molar Zr and Ti in starting solution, no phase separation or impurity phase (anatase) was observed in any of the ZT samples, because all our ZT precursor particles are purely amorphous. It can be inferred that titanium tends to coprecipitate with equal moles of zirconium to form amorphous ZT compounds. Otherwise, titanium will form the undesirable anatase/brookite phase if it precipitates out alone. In fact, this homogeneity in molecular composition (in terms of the Zr/Ti ratio) has been verified by the TEM/EDS technique. The compositions at three different positions inside the microsphere (FIG. 9(a)) show almost identical composition. However, when the molar ratio Ti/Zr=2 was used in the initial mixture solution, it was observed the crystalline titania (anatase/brookite phase) in the as-prepared sample. With heat treatment from 27 to 1200° C., the rest of the amorphous phase in the titania-containing sample converts the ZrTiO$_4$ phase while the titania phase coexists. Obviously, there is a certain tolerance of deviation from an equal molarity Ti/Zr ratio within which single-crystalline ZrTiO$_4$ phase will form. Clearly, the ratio of Ti/Zr=2 is beyond this tolerance.

Figure 10A:
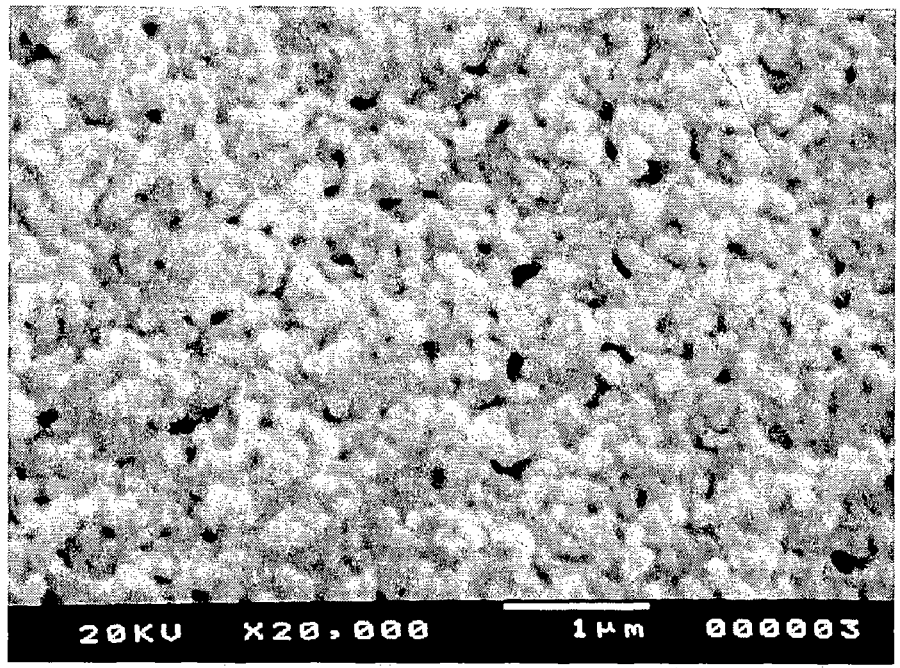
FIG. 10a is a SEM image of ZT nanosphere particles by rapid microwave heating process, microwave heating time for 2 seconds, under the following conditions: C=0.05 M, RH=3/1, T=not measured, HPC=2.0×10$^{-3}$ g/cm$^3$.
Figure 10B:
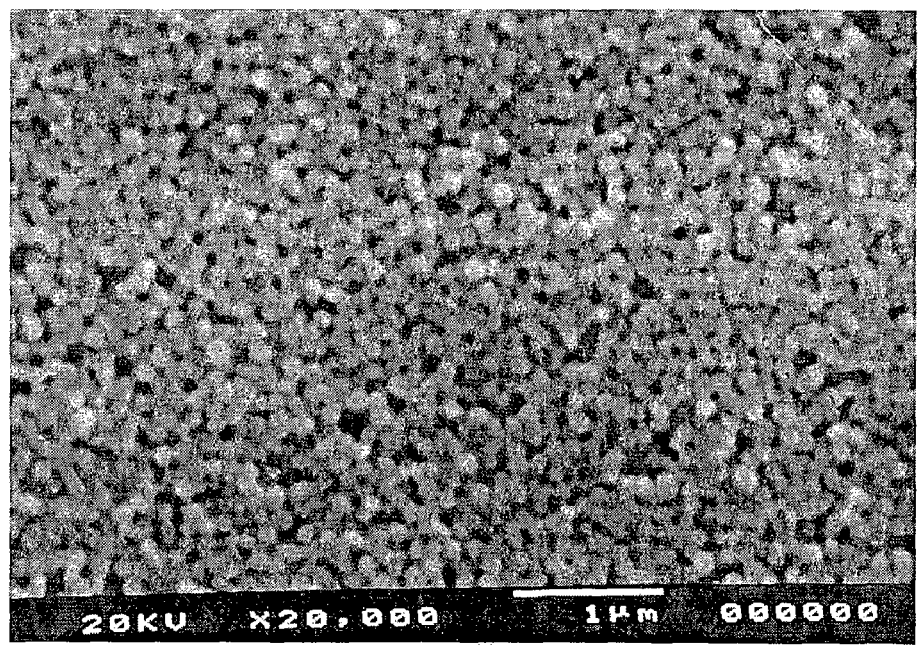
FIG. 10b is a SEM image of ZT nanosphere particles by rapid microwave heating process, microwave heating time for 5 seconds, under the following conditions: C=0.05 M, RH=3/1, T=not measured, HPC=2.0×10$^3$ g/cm$^3$.

Relative to the hydrothermal process, which usually uses autoclave vessels heated in a conventional oven, microwave heating represents an efficient and controllable means for hydrothermal processing due to the potential uniform volumetric heating. FIGS. 10(a) and 10(b) show SEM photos of ZT particles obtained by a rapid microwave heating incubation at 2 and 5 s, respectively. Under similar conditions, microwave heating required a very short time to produce much smaller, more uniform dispersed nanosphere particles than the conventional oven incubation. The rapid burst of nucleation of larger population density of nuclei in the solution may explain the smaller size. The microwave heating rate could be used as an important parameter to control the particle size. This result clearly indicates microwave hydrothermal processing as a route to produce nanoparticles.

The dielectric-tuning coprecipitation method of the present invention is different from the chemical precipitation reported by Leoni et al. ("Aqueous Synthesis and Sintering of Zirconium Titanate Powders for Microwave Components", *J. Eur. Ceram. Soc.*, 21, 1739–41, 2001), although both process may use the same mixed zirconium and titanium salts. The chemical precipitation process is hard to control and inhomogeneous and produces precipitates in the form of nonsphere agglomerates. In contrast, the dielectric-tuning process generates a homogeneous nucleation and growth environment, is controllable by varying alcohol content and temperature, and produce precipitates consisting of dispersed, near-uniform-sized microsphere particles and nanosphere particles.

While there has been shown and described what are at present considered the preferred embodiments of the invention, it will be obvious to those skilled in the art that various changes and modifications can be made therein without departing from the scope of the invention defined by the appended claims.

What is claimed is:

1. A method for making amorphous spherical particles of zirconium titanate having tailored intraparticle nanostructures comprising the steps of:
   a) preparing an aqueous solution of a zirconium salt;
   b) preparing an aqueous solution of a titanium salt;
   c) mixing said solution of zirconium salt with said solution of titanium salt into a mixed salt solution wherein said mixed salt solution has about equal moles of zirconium and titanium and wherein said mixed salt solution has a total salt concentration in the range from 0.01 M to about 0.5 M;
   d) adding a stearic dispersant and an organic solvent to said mixed salt solution, subjecting said zirconium salt and said titanium salt in said mixed salt solution to a coprecipitation reaction to form a liquid solution containing amorphous spherical particles of zirconium titanate having tailored intraparticle nanostructures wherein the volume ratio of said organic solvent to aqueous part is in the range from 1 to 5.

2. A method for making fine or ultrafine crystalline spherical particles of zirconium titanate having tailored intraparticle nanostructures according to the steps of claim 1, further comprising the step of incubating said liquid solution of step d) containing amorphous spherical particles of zirconium titanate in an oven at a temperature of less than or equal to 100° C. for a period of time of less than or equal to 24 hours to convert said amorphous spherical particles of zirconium titanate to fine or ultrafine crystalline spherical particles of zirconium titanate wherein said salt concentration, said volume ratio of said organic solvent to aqueous part, said temperature of said oven and said incubation time are selected to produce said spherical particles having a desired size and tailored intraparticle nanostructure.

3. The method of claim 2 wherein said oven is a microwave oven to induce rapid nucleation and growth of said spherical particles to produce nanosized spherical particles.

4. The method of claim 3 wherein said incubation time in said microwave oven is from about 2 seconds to about 6 seconds.

5. The method of claim 2 wherein said incubation temperature is 100° C.

6. The method of claim 1 wherein said stearic dispersant is hydroxypropylcellulose.

7. The method of claim 6 wherein said concentration of said hydroxypropylcellulose is fixed at 0.002 g/cm$^3$.

8. The method of claim 1 wherein said organic solvent is selected from the group consisting of methanol, ethanol, isopropanol, n-propanol, tert butyl alcohol, n-butanol, acetone and glycerol.

9. The method of claim 8 wherein said organic solvent is isopropanol.

10. The method of claim 1 wherein said zirconium salt is zirconyl chloride.

11. The method of claim 1 wherein said titanium salt is titanium tetrachloride.

* * * * *

UNITED STATES PATENT AND TRADEMARK OFFICE
CERTIFICATE OF CORRECTION

| | | |
|---|---|---|
| PATENT NO. | : 7,049,347 B2 | Page 1 of 1 |
| APPLICATION NO. | : 10/623395 | |
| DATED | : May 23, 2006 | |
| INVENTOR(S) | : Michael Z. Hu | |

It is certified that error appears in the above-identified patent and that said Letters Patent is hereby corrected as shown below:

Column 1, line 42, "see Chen et at." should be -- (see Chen et al. --.

Column 1, line 45, "Cerqueira et at." should be -- Cerqueira et al. --.

Column 5, line 10, "thermociravimetric" should be -- thermogravimetric --.

Column 6, line 38, "mm" should be -- min --.

Column 6, line 63, "Monodispersed" should be -- Monodisperse --.

Column 8, line 5, "Epuimolar" should be -- Equimolar --.

Column 8, line 37, "dependingon" should be -- depending on --.

Signed and Sealed this

Seventh Day of November, 2006

JON W. DUDAS
*Director of the United States Patent and Trademark Office*